United States Patent [19]
Nanba et al.

[11] 3,870,655
[45] Mar. 11, 1975

[54] CATALYST FOR THE PREPARATION OF ANTHRAQUINONE

[75] Inventors: Yoku Nanba, Osaka; Tetsuji Ono, Amagasaki; Yukio Okuda, Osaka, all of Japan

[73] Assignee: Nippon Shokubai Kagaku Kogyod Co., Ltd., Osaka, Japan

[22] Filed: Jan. 26, 1973

[21] Appl. No.: 326,814

[52] U.S. Cl. .............. 252/435, 252/437, 252/443, 252/455 R, 252/456, 252/464, 252/476, 260/385
[51] Int. Cl. ............................................. B01j 11/82
[58] Field of Search .......... 252/437, 464, 476, 435, 252/455 R, 456, 443; 260/385

[56] References Cited
UNITED STATES PATENTS

| | | | |
|---|---|---|---|
| 1,880,322 | 10/1932 | Jaeger | 260/385 |
| 2,824,881 | 2/1958 | Wettstein | 260/385 |
| 2,954,385 | 9/1960 | Burney et al. | 260/385 X |
| 2,977,324 | 3/1961 | Dowden et al. | 252/464 X |
| 2,995,528 | 8/1961 | Dowden et al. | 252/464 |
| 3,351,565 | 11/1967 | Kerr | 252/437 |
| 3,464,930 | 9/1969 | Freidrichsen et al. | 252/476 X |
| 3,565,829 | 2/1971 | Friedrichsen et al. | 252/464 |
| 3,684,741 | 8/1972 | Friedrichsen et al. | 252/435 |

FOREIGN PATENTS OR APPLICATIONS

| | | | |
|---|---|---|---|
| 182,843 | 7/1922 | Great Britain | 252/461 |
| 45-1220 | 12/1970 | Japan | 252/476 |

*Primary Examiner*—Patrick P. Garvin
*Attorney, Agent, or Firm*—Armstrong, Nikaido & Wegner

[57] ABSTRACT

A catalyst for the preparation of anthraquinone by vapor phase oxidation of anthracene with a molecular oxygen-containing gas comprising a catalytic material supported on an inert carrier, said catalytic material comprising 100 parts by weight, calculated as titanium dioxide, of titanium, 1 to 45 parts by weight, calculated as vanadium pentoxide, of vanadium, 0.05 to 15 parts by weight, calculated as oxide thereof, of at least two metal oxides selected from the group consisting of $Li_2O$, $Na_2O$, $K_2O$, $Rb_2O$, $Cs_2O$ and $Tl_2O$, 0 to 5 parts by weight, calculated as phosphorus pentoxide, of phosphorus and 0 to 5 parts by weight, calculated as niobium pentoxide, of niobium.

11 Claims, No Drawings

CATALYST FOR THE PREPARATION OF ANTHRAQUINONE

This invention relates to a catalyst for the preparation of anthraquinone by vapor phase oxidation of anthracene with a molecular oxygen-containing gas. More particularly, it is concerned with a catalyst for the preparation of anthraquinone by vapor phase oxidation of anthracene which comprises titanium, vanadium and at least two metal oxides selected from the group consisting of $Li_2O$, $Na_2O$, $K_2O$, $Rb_2O$, $Cs_2O$ and $Tl_2O$ and, optionally, at least one member of the group consisting of phosphorus and niobium, supported on an inert carrier.

In general, anthraquinone has been prepared by: vapor phase catalytic oxidation of anthracene with a molecular oxygen-containing gas, oxidation of anthracene with chromic acid, electrolytic oxidation of anthracene, Friedel-Crafts reaction between phthalic anhydride and benzene or Diels-Alder reaction between 1,4-naphthoquinone and 1,3-butadiene. Among these known processes, the vapor phase catalytic oxidation process is the most convenient because of unnecessity for any auxiliary raw material and is now the leading industrial process through the world.

As the catalyst for use in the vapor phase catalytic oxidation of anthracene there have been proposed vanadium pentoxide, vanadium pentoxide-potassium sulfate, vanadium pentoxide-potassium sulfate-iron oxide, vanadium pentoxide-two or more alkali metal compounds and like systems. These known catalysts, however, are unsatisfactory in an industrial aspect because of some drawbacks: e.g., low yield of anthraquinone, low productivity due to a low space velocity, inferior quality of the product anthraquinone due to a low purity of a crude anthraquinone, or shortness of the catalyst life.

It is an object of the present invention to provide a novel catalyst for the preparation of anthraquinone by vapor phase oxidation of anthracene by means of a molecular oxygen-containing gas.

Another object of the present invention is to provide a catalyst for the preparation of anthraquinone by vapor phase oxidation of anthracene which is retainable a high yield of anthraquinone at a high space velocity for a long period of time.

Still another object of the present invention is to provide an improved process for the preparation of anthraquinone by vapor phase oxidation of anthracene.

A further object of the present invention is to provide a process for the preparation of anthraquinone at a high yield with a low yield of by-products.

A catalyst for the preparation of anthraquinone by vapor phase oxidation of anthracene by means of a molecular oxygen-containing gas in accordance with the present invention comprises a catalytic material, supported on an inert carrier or support, comprising 100 parts by weight, calculated as titanium dioxide, of titanium, 1 to 45 parts by weight, calculated as vanadium pentoxide, of vanadium, 0.05 to 15 parts by weight, calculated as an oxide, of at least two metal oxides selected from the group consisting of $Li_2O$, $Na_2O$, $K_2O$, $Rb_2O$, $Cs_2O$ and $Tl_2O$, 0 to 5 parts by weight, calculated as pentoxide, of phosphorus and 0 to 5 parts by weight, calculated as pentoxide, of niobium. Anthraquinone can be prepared at a high yield as high as 102 to 111 % by weight for a long period of time under the condition of a extremely high space velocity by vapor phase oxidation of anthracene at temperatures of 350° to 500°C by means of a molecular oxygen-containing gas in the presence of this catalyst.

Illustrating in more detail, in the catalyst of the present invention, while it is not affirmable, each element in the catalytic material is believed to be in the form of an oxide. Therefore, the catalytic material has a composition as follows: 100 parts by weight, calculated as $TiO_2$, of titanium, 1 to 45, preferably 2 to 35 parts by weight, calculated as $V_2O_5$, of vanadium, 0.05 to 15, preferably 0.5 to 10 parts by weight, calculated as oxide, of at least two metal oxides selected from the group consisting of $Li_2O$, $Na_2O$, $K_2O$, $Rb_2O$, $Cs_2O$ and $Tl_2O$ and, optionally, 0 to 5, preferably 0.05 to 3 parts by weight, calculated as phosphorus pentoxide $P_2O_5$, of phosphorus and 0 to 5, preferably 0.05 to 3 parts by weight, calculated as niobium pentoxide $Nb_2O_5$, of niobium.

The alkali metals and thallium include lithium, sodium, potassium, rubidium, cesium and thallium. The amounts of oxides thereof are calculated respectively as $Li_2O$, $Na_2O$, $K_2O$, $Rb_2O$, $Cs_2O$ and $Tl_2O$. It is more desirable to employ a combination of two or more of such oxides than to employ one of such oxides alone.

As the raw materials for the preparation of the catalytic material there may be used ammonium salt, sulfate, nitrate, carbonate, phosphate, halide, hydroxide, organic acid salt or other compounds of titanium, vanadium, alkali metals, thallium, phosphorus and niobium, respectively. Typical examples of such compounds are: ammonium metavanadate, dihydrogen ammonium phosphate, lithium sulfate, sodium sulfate, potassium sulfate, rubidium sulfate, cesium sulfate, thallium sulfate, lithium nitrate, sodium nitrate, potassium nitrate, cesium nitrate, thallium nitrate, lithium carbonate, sodium carbonate, potassium carbonate, dihydrogen sodium phosphate, titanium tetrachloride, lithium chloride, rubidium chloride, niobium chloride, titanium dioxide, sodium hydroxide, potassium hydroxide, vanadyl acetate, sodium acetate, potassium acetate, thallium acetate, sodium propionate and the like.

As the titanium it is preferable to employ a titanium dioxide $TiO_2$ having a surface area, as determined by Brunauer-Emmett-Teller method (BET method), of 1 to 80, preferably 3 to 50 m²/g. The both of rutile and anatase are suitably used as the titanium oxide. Mixtures of the both may also be suitably used. For reducing the yield of phthalic anhydride, of maleic anhydride and of naphthalene dicarboxylic acids as by-products and minimizing the contents of organic acids in the crude anthraquinone it is more advantageous to substitute 5 to 100 percent by weight of a titanium dioxide of anatase type by a titanium dioxide of rutile type than to employ the former alone.

The catalyst in accordance with the present invention may be incorporated with at most 1 percent by weight, calculated as its highest valency oxide based on the weight of $TiO_2$, of the group $Ib$, $IIa$ and $IIb$ elements of the Periodic Table, aluminum, zirconium, silicon, tin, lead, antimony, chromium, molybdenum, tungsten, cobalt and nickel, respectively.

The catalyst in accordance with the present invention may be prepared by various procedures. For instance, a finely divided titanium oxide or titanium compound which is thermally decomposable into titanium dioxide is stirred into an aqueous oxalic, nitric or hydrochloric acid solution containing compounds of vanadium and alkali metal and/or thallium and, optionally, phosphorus and/or niobium and resulting catalytic component mixture is sprayed on an inert carrier which is being heated, to be supported thereon. The supported mixture is then calcined in an oxidative atmosphere, e.g., in a stream of air, at a temperature of 400° to 550°C for at least 3 hours. Portions of the catalytic components may previously be incorporated in the titanium dioxide or there may be employed a titanium dioxide containing at least portion of such catalytic component. The weight of the catalytic mixture to be supported on the carrier varies depending on the specific gravity, shape, particle size and other factors of the carrier employed, though it is preferred in general to support 3 to 15 g of a catalytic mixture on 100 cc of a carrier.

The carriers suitably used for the preparation of the catalyst of the present invention include inert materials in a regularly molded or irregularly ground form comprising an alpha-alumina, silex, quartz, silicon carbide SiC, aluminum silicate, magnesium silicate and mixtures thereof. The carrier preferably is of an average size of 3 to 10 mm and in the form of sphere, pellet or ring.

In the manufacture of anthraquinone employing the catalyst of the present invention, an iron or stainless steel pipe of an inner diameter of 20 to 40, preferably 25 to 30 mm is packed with the catalyst and immersed in a fused salt bath and a gaseous mixture of anthracene and a molecular oxygen-containing gas is passed through the catalyst bed to conduct the vapor phase oxidation. The fused salt bath is maintained at a temperature of 350° to 500°C, preferably 380° to 430°C.

As the molecular oxygen-containing gas there is usually used air, though there may be used gaseous oxygen properly diluted with a gaseous nitrogen, gaseous carbon dioxide or like inert gas. The gaseous anthracene is fed into the reaction zone in a concentration of, in case where it used air as the oxidizing agent, 25 to 50, preferably 25 to 35 liter-air/g-antracene. In case of an oxidizing agent containing gaseous oxygen diluted with an inert gas, the oxidation is conveniently carried out in a similar concentration of anthracene. The preferred space velocity of the gaseous reaction mixture ranges from 3,000 to 10,000 $hr^{-1}$, more desirably from 5,000 to 8,000 $hr^{-1}$. Under the reaction conditions of a higher fused salt bath temperature and/or of a lower space velocity outside the above mentioned ranges, the yield of organic acids as by-products increases, while, on the other hand, under the reaction condition of a lower fused bath temperature and/or of a higher space velocity the conversion of anthracene decrease, and, thus, in both cases the yield of anthraquinone decreases, so that it is desirable to carry out the reaction under the conditions within the above mentioned ranges. The composition of catalyst and optimum reaction conditions should be appropriately chosen within the above mentioned ranges.

In the practice of the process of the present invention, there may be incorporated in the gaseous reaction mixture 2 to 20 percent by volume of steam as to enhance the selectivity of oxidation to antranquinone, to stabilize the catalyst for a long period of time, to surpress the maximum temperature of the catalyst bed thereby to reduce yield of organic acids as by-products even in case where there is used anthracene of a low purity and, thus, to improve the steadiness of the capability of the catalyst bed.

In the following examples all percentage is by weight unless otherwise indicated.

EXAMPLE 1

In 180 cc of deionized water there was dissolved 7.5 g of oxalic acid to form an aqueous oxalic acid solution, then dissolved therein 3.36 g of ammonium metavanadate with heating. On the other hand, 0.77 g of cesium sulfate and 0.55 g of potassium sulfate were dissolved in a small quantity of water and added to the vanadium solution. The mixture was stirred at 50° to 60°C for 30 minutes. Into the mixed solution there was added 30 g of a titanium dioxide (rutile: anatase ratio = 95:5 by weight, BET surface area = 7 $m^2/g$) and the mixture was worked in a homogenizer to form a catalyst slurry. Into a stainless steel rotor of a diameter of 20 cm and a length of 30 cm which could be heated externally there was charged 100 cc of irregularly shaped SiC carrier of particle sizes of 3 to 5 mm and the above catalyst slurry was sprayed thereon with heating to support thereon about 9 g of a catalytic material. The supported catalytic material was then calcined at 500°C for 8 hours in a muffle furnace with passing air therethrough. The composition of the catalytic coating film thus formed on the carrier was of $TiO_2:V_2O_5:Cs_2O:K_2O$ = 100:8.7:2:1 by weight.

A stainless steel tube of an inner diameter of 25 mm immersed in a fused salt bath was packed with 40 cc of the catalyst thus obtained and anthracene of a purity of 98.5 percent was oxidized therethrough at a gas concentration of 30 liter-air/g-anthracene, at a space velocity of 8,000 $hr^{-1}$ and at a fused salt bath temperature of 420°C by means of air to obtain the following results.

| | |
|---|---|
| Total yield | 115.2 % |
| Crude anthraquinone yield | 111.3 % |
| Anthraquinone yield | 110.5 % |
| Unreacted anthracene | 0.4 % |

The values of yield were calculated on the basis of a weight of the raw anthracene converted to 100 percent purity, and the total yield was determined by gravimetric analysis. The whole product was boiled in water to eliminate soluble matters and the residue was regarded as the crude anthraquinone. Determination of anthraquinone and of unreacted anthracene were performed ultraviolet absorption analysis using chloroform as solvent.

In all the following Examples there was used anthracene of a purity of 98.5 percent as raw material.

EXAMPLE 2

A catalyst slurry was prepared in the same procedure as in Example 1 using 4.2 g of ammonium metavanadate, 0.85 g of cesium sulfate, 0.97 g of potassium nitrate and 30 g of a titanium dioxide of anatase type having a BET surface area of 31 $m^2/g$. The catalyst slurry was applied to a SiC molded carrier of a diameter of 5 mm in a proportion of 8 g-catalytic material/100 cc-carrier and calcined at 450°C for 8 hours in the same manner as in Example 1 to provide a catalyst. The composition of the catalytic material layer in the catalyst thus obtained was as follows: $TiO_2:V_2O_5:Cs_2O:K_2O = 100:10.9:2.2:1.5$ by weight.

Anthracene was oxidized by air using 60 cc of the catalyst at a bath temperature of 400°C, a space velocity of 7,000 hr$^{-1}$ and a gas concentration of 30 liter-air/g-anthracene to obtain the following results.

| | |
|---|---|
| Total yield | 113.5 % |
| Crude anthraquinone yield | 106.1 % |
| Anthraquinone yield | 105.3 % |
| Unreacted anthracene | 0.6 % |

EXAMPLE 3

An anatase-type titanium dioxide having a BET surface area of 8 m$^2$/g and containing 0.22 percent of $P_2O_5$, 0.1 % of $K_2O$ and 0.25% of $Nb_2O_5$, ammonium metavanadate, cesium sulfate, potassium sulfate, dihydrogen ammonium phosphate and niobium chloride, as raw materials for a catalyst, were processed and supported on an irregularly ground SiC carrier of sizes of 3 to 5 mm in a proportion of 9 g/100 cc-carrier in the same manner as in Example 1 and then calcined at 500°C for 8 hours to provide a catalyst. The composition of the catalytic layer in the catalyst thus obtained was as follows: $TiO_2:V_2O_5:K_2O:Cs_2O:P_2O_5:Nb_2O_5 = 100:5:0.5:2:1.5:0.5$ by weight.

Using 40 cc of the catalyst anthracene was oxidized at a bath temperature of 430 C, a space velocity of 8,000 hr$^{-1}$ and a gas concentration of 30 liter-air/g-anthracene to obtain the following results.

| | |
|---|---|
| Total yield | 113.9 % |
| Crude anthraquinone yield | 106.2 % |
| Anthraquinone yield | 105.1 % |
| Unreacted anthracene | 0.4 % |

EXAMPLE 4

The titanium dioxide as used in Example 3 was calcined at 850°C for 6 hours to obtain a titanium dioxide of a ruitile content of 40 percent. A catalyst was prepared using the denaturalized titanium dioxide in the same manner as in Example 3. Using the catalyst thus prepared anthracene was oxidized at a bath temperature of 430°C, a space velocity of 6,000 hr$^{-1}$ and a gas concentration of 30 liter-air/g-antracene to obtain the following results.

| | |
|---|---|
| Total yield | 115.5 % |
| Crude anthraquinone yield | 110.8 % |
| Anthraquinone yield | 109.2 % |
| Unreacted anthracene | 1.5 % |

EXAMPLE 5

In 180 cc of deionized water there was dissolved 10 g of oxalic acid to form an aqueous oxalic acid solution, then added thereto 5 g of ammonium metavanadate, 1.37 g of sodium sulfate and 0.39 g of rubidium chloride. The mixture was stirred at a temperature of 50° to 60°C for 30 minutes. To the solution thus obtained there was added 30 g of a titanium dioxide of the same kind as used in Example 1 to form a catalyst slurry. On a pelletized SiC carrier of 4 mm length × 4 mm diameter there was sprayed the catalyst slurry to support a catalytic material thereon in the proportion of 9 g/100 cc-carrier and then calcined at 450°C for 5 hours in a similar manner as in Example 1 to provide a catalyst. The composition of the catalytic layer in the catalyst thus obtained was as follows: $TiO_2:V_2O_5:Na_2O:Rb_2O = 100:13:2:1$ by weight.

Using 60 cc of the catalyst anthracene was oxidized at a bath temperature of 400°C, a space velocity of 6,000 hr$^{-1}$ and a gas concentration of 30 liter-air/g-anthracene to obtain the following results.

| | |
|---|---|
| Total yield | 113.0 % |
| Crude anthraquinone yield | 107.2 % |
| Anthraquinone yield | 105.4 % |
| Unreacted anthracene | — |

EXAMPLE 6

A catalyst slurry was prepared in the same manner as in Example 1 using 3.86 g of ammonium metavanadate, 0.77 g of cesium sulfate, 1.11 g of lithium carbonate and 30 g of a titanium dioxide of the same quality as used in Example 4. The catalyst material was supported on a SiC molded carrier of a diameter of 5 mm in a proportion of 8 g/100 cc-carrier and calcined at 550°C for 8 hours in the manner as in Example 1 to provide a catalyst. The composition of the catalytic layer in the catalyst thus obtained was as follows: $TiO_2:V_2O_5:Cs_2O:Li_2O = 100:10:2:1.5$ by weight.

Anthracene was oxidized using 60 cc of the catalyst at a bath temperature of 430°C, a space velocity of 6,000 hr$^{-1}$ and a gas concentration of 30 liter-air/g-anthracene to obtain the following results.

| | |
|---|---|
| Total yield | 114.5 % |
| Crude anthraquinone yield | 109.0 % |
| Anthraquinone yield | 108.3 % |
| Unreacted anthracene | 0.2 % |

EXAMPLE 7 to 11

A catalyst slurry was prepared in the same manner as in Example 1 using 1.93 g of ammonium metavanadate, 0.58 g of cesium sulfate, 0.55 g of potassium sulfate, 0.39 g of rubidium chloride and a titanium dioxide of the same quality as used in Example 4. On each of the following 5 carriers there was supported the catalyst slurry in a proportion of 9 g-catalytic material/100 cc-carrier, and each supported carrier was calcined at 500°C for 8 hours in the same manner as in Example 1. The composition of the catalytic layer in the catalysts thus obtained was as follows: $TiO_2:V_2O_5:Cs_2O:K_2O:Rb_2O = 100:5:1.5:1:1$ by weight.

Carriers:
A: Irregular-formed alpha-alumina of 3 to 5 mm diameter
B: Irregular-formed silex of 3 to 5 mm diameter
C: Aluminum silicate ball of 5 mm diameter consisting of $SiO_2$ 87 percent, $Al_2O_3$ 12 percent and ($K_2O$ + $Na_2O$) 1 percent D: Magnesium silicate ball of 5 mm diameter consisting of MgO 33 percent, $SiO_2$ 66 percent and ($K_2O$ + $Na_2O$) 1 percent E: Molded carrier of 5 mm diameter consisting of SiC 85 percent, $Al_2O_3$ 3 percent and $SiO_2$ 12 percent Anthracene was oxidized using the catalyst thus obtained in vapor phase at a gas concentration of 30 liter-air/g-anthracene under the temperature and space velocity conditions, as indicated in the following Table 1, to obtain the results as summarized in the Table 1.

| Example | Carrier | Temperature (°C) | S.V. ($hr^{-1}$) | Total yield (%) | Crude anthraquinone (%) | Anthraquinone (%) | Unreacted anthracene (%) |
|---|---|---|---|---|---|---|---|
| 7 | A | 410 | 5,500 | 114.1 | 108.9 | 107.8 | 0.5 |
| 8 | B | 440 | 7,000 | 112.3 | 108.0 | 107.2 | 0.7 |
| 9 | C | 430 | 8,000 | 114.8 | 110.9 | 110.2 | 0.6 |
| 10 | D | 430 | 6,000 | 113.3 | 108.4 | 107.4 | 0.9 |
| 11 | E | 410 | 8,000 | 115.4 | 111.1 | 110.2 | 0.5 |

EXAMPLE 12

A catalyst slurry was prepared in the same manner as in Example 1 using 3.09 g of ammonium metavanadate, 0.77 g of cesium sulfate, 0.28 g of potassium sulfate, 0.74 g of lithium carbonate and 30 g of a titanium dioxide as used in Example 4. The catalytic material was supported on an irregular-formed SiC carrier of 3 to 5 mm diameter in a proportion of 9 g/100 cc-carrier and then calcined at 550°C for 6 hours in a muffle furnace with passing air therethrough to provide a catalyst. The composition of the catalytic layer in the catalyst was as follows: $TiO_2:V_2O_5:Cs_2O:K_2O:Li_2O = 100:8:2:0.5:1$ by weight.

Anthracene was oxidized using 40 cc of the catalyst at a bath temperature of 420°C, a space velocity of 7,000 $hr^{-1}$ and a gas concentration of 30 liter-air/g-anthracene to obtain the following results.

| | |
|---|---|
| Total yield | 113.8 % |
| Crude anthraquinone yield | 109.5 % |
| Anthraquinone yield | 108.8 % |
| Unreacted anthracene | 0.6 % |

EXAMPLE 13

A catalyst slurry was prepared in the same manner as in Example 1 using 0.97 g of ammonium metavanadate, 0.83 g of potassium sulfate, 0.69 g of sodium sulfate, 0.49 g of dihydrogen ammonium phosphate, 0.61 g of niobium chloride and 30 g of a rutile-type titanium dioxide of a BET surface area of 5.3 $m^2/g$. The catalytic material was supported on a pelletized SiC molded carrier of 4 mm length × 4 mm diameter in a proportion of 8.5 g/100 cc-carrier and then calcined at 450°C for 5 hours in a muffle furnace with passing air therethrough to prepare a catalyst. The composition of the catalytic layer in the catalyst was as follows: $TiO_2:V_2O_5:K_2O:Na_2O:P_2O_5:Nb_2O_5 = 100:2.5:1.5:1:1:1$, by weight.

Anthracene was oxidized using 60cc of the catalyst at a bath temperature of 400°C, a space velocity of 5,000 $hr^{-1}$ and a gas concentration of 30 liter-air/g-anthracene to obtain the following results.

| | |
|---|---|
| Total yield | 114.3 % |
| Crude anthraquinone yield | 108.0 % |
| Anthraquinone yield | 106.8 % |
| Unreacted anthracene | 0.3 % |

EXAMPLE 14

A catalyst slurry was prepared in the same manner as in Example 1 using 5.79 g of ammonium metavanadate, 0.77 g of cesium sulfate, 0.75 g of thallium nitrate and 30 g of a titanium dioxide as used in Example 1. The catalytic material was supported on an irregular-formed SiC carrier in a proportion of 8 g/100 cc-carrier and then calcined at 500°C for 5 hours in a muffle furnace with passing air therethrough to prepare a catalyst. The composition of the catalytic layer in the catalyst thus obtained was as follows: $TiO_2:V_2O_5:Cs_2O:Tl_2O = 100:15:2:2$, by weight.

Anthracene was oxidized using 40 cc of the catalyst at a bath temperature of 410°C, a space velocity of 8,000 $hr^{-1}$ and a gas concentration of 30 liter-air/g-anthracene to obtain the following results.

| | |
|---|---|
| Total yield | 115.3 % |
| Crude anthraquinone yield | 111.0 % |
| Anthraquinone yield | 110.3 % |
| Unreacted anthracene | 0.6 % |

EXAMPLE 15

A catalyst slurry was prepared in the same procedure as in Example 1 using 7.72 g of ammonium metavanadate, 1.16 g of rubidium chloride, 0.83 g of potassium sulfate and a rutile-type titanium dioxide of a BET surface area of 21 $m^2/g$. The catalytic material was supported on a SiC molded carrier of 5 mm diameter in a proportion of 8 g/100 cc-carrier and then calcined at 500°C for 8 hours in a muffle furnace with passing air therethrough to obtain a catalyst. The composition of the catalytic layer in the catalyst was as follows: $TiO_2:V_2O_5:Rb_2O:K_2O = 100:20:3:1.5$, by weight.

Anthracene was oxidized using 60 cc of the catalyst at a bath temperature of 410°C, a space velocity of 7,000 $hr^{-1}$ and a gas concentration of 30 liter-air/g-anthracene to obtain the following results.

| | |
|---|---|
| Total yield | 112.5 % |
| Crude anthraquinone yield | 107.3 % |
| Anthraquinone yield | 106.4 % |
| Unreacted anthracene | 0.1 % |

EXAMPLE 16

In an aqueous oxalic acid solution there were dissolved 13.5 g of ammonium metavanadate, 1.54 g of cesium sulfate, 1.66 g of potassium sulfate and 71.4 g of titanium tetrachloride to form a solution. To the soution was added 250 cc of an irregular-formed SiC carrier of 3 to 5 mm diameter, and the mixture was then heated on a water bath to concentrate the solution and to deposit the catalyst material on the carrier. The carrier bearing thereon the catalytic components was then calcined at 550°C for 10 hours in a muffle furnace with passing air therethrough to prepare a catalyst supporting the catalytic material in a proportion of 9.5 g/100 cc-carrier. The composition of the catalytic material in the catalyst was as follows: $TiO_2:V_2O_5:Cs_2O:K_2O = 100:35:4:3$, in weight ratio.

Anthracene was oxidized using 40 cc of the catalyst at a bath temperature of 430°C, a space velocity of 6,500 $hr^{-1}$ and a gas concentration of 30 liter-air/g-anthracene to obtain the following results:

| | |
|---|---|
| Total yield | 111.2 % |
| Crude anthraquinone yield | 104.2 % |
| Anthraquinone yield | 103.5 % |
| Unreacted anthracene | 0.02 %. |

What is claimed is:

1. A catalyst for the preparation of anthraquinone by vapor phase oxidation of anthracene with a molecular oxygen-containing gas consisting essentially of a catalytic material supported on an inert carrier, said catalytic material consisting essentially of 100 parts by weight of $TiO_2$, 1 to 45 parts by weight of $V_2O_5$ and 0.05 to 15 parts by weight of at least two metal oxides selected from the group consisting of $Li_2O$, $Na_2O$, $K_2O$, $Rb_2O$, $Cs_2O$ and $Tl_2O$.

2. A catalyst for the preparation of anthraquinone by vapor phase oxidation of anthracene with a molecular oxygen-containing gas consisting essentially of a catalytic material supported on an inert carrier, said catalytic material consisting essentially of 100 parts by weight of $TiO_2$, 1 to 45 parts by weight of $V_2O_5$, 0.05 to 15 parts by weight of at least two metal oxides selected from the group consisting of $Li_2O$, $Na_2O$, $K_2O$, $Rb_2O$, $Cs_2O$ and $Tl_2O$, 0.05 to 5 parts by weight of $P_2O_5$ and 0.05 to 5 parts by weight of $Nb_2O_5$.

3. A catalyst according to claim 2, wherein the titanium is employed in the form of titanium dioxide having a BET surface area of 1 to 80 $m^2/g$.

4. A catalyst according to claim 2, wherein the titanium is employed in the form of titanium dioxide having a BET surface area of 3 to 50 $m^2/g$.

5. A catalyst according to claim 3, wherein the titanium dioxide is anatase type.

6. A catalyst according to claim 3, wherein the titanium dioxide is rutile type.

7. A catalyst according to claim 3, wherein the titanium dioxide is a mixture of 95 to 0 percent by weight of anatase type and, correspondingly, 5 to 100 percent of rutile type.

8. A catalyst according to claim 3, wherein the inert carrier is at least one material selected from the group consisting of alpha-alumina, silex, quartz, silicon carbide, aluminum silicate and magnesium silicate.

9. A catalyst for the preparation of anthraquinone by vapor phase oxidation of anthracene with a molecular oxygen-containing gas consisting essentially of a catalytic material supported on the inert carrier, said catalytic material consisting essentially of 100 parts by weight of $TiO_2$, 2 to 35 parts by weight of $V_2O_5$, 0.5 to 10 parts by weight of at least two metal oxides selected from the group consisting of $Li_2O$, $Na_2O$, $K_2O$, $Rb_2O$, $Cs_2O$ and $Tl_2O$, 0.05 to 5 by weight of $P_2O_5$ and 0.05 to 5 parts by weight of $Nb_2O_5$.

10. A catalyst for the preparation of anthraquinone by vapor phase oxidation of anthracene with a molecular oxygen-containing gas consisting essentially of a catalytic material supported on an inert carrier, said catalytic material consisting essentially of 100 parts by weight of $TiO_2$, 1 to 45 parts by weight of $V_2O_5$, 0.05 to 15 parts by weight of at least two metal oxides selected from the group consisting of, $Li_2O$, $Na_2O$, $K_2O$, $Rb_2O$, $Cs_2O$ and $Tl_2O$, 0.05 to 3 parts by weights of $P_2O_5$, and 0.05 to 3 parts by weight of $Nb_2O_5$.

11. A catalyst for the preparation of anthraquinone by vapor phase oxidation of anthracene with a molecular oxygen-containing gas consisting essentially of a catalytic material supported on an inert carrier, said catalytic material consisting essentially of 100 parts by weight of $TiO_2$, 2 to 35 parts by weight, of $V_2O_5$ 0.05 to 10 parts by weight of at least two metal oxides selected from the group consisting of $Li_2O$, $Na_2O$, $H_2O$, $Rb_2O$, $Cs_2O$, and $Tl_2O$ 0.05 to 3 parts by weight of $P_2O_5$ and 0.05 to 3 parts by weight of $Nb_2O_5$.

* * * * *

UNITED STATES PATENT OFFICE
CERTIFICATE OF CORRECTION

Patent No. 3,870,655     Dated    March 11, 1975

Inventor(s)   YOKU NANBA ET AL

It is certified that error appears in the above-identified patent and that said Letters Patent are hereby corrected as shown below:

The correct name of the Assignee should read as follows:

-- Nippon Shokubai Kagaku Kogyo Co.,Ltd., Osaka,Japan --.

Signed and sealed this 10th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,870,655          Dated  March 11, 1975

Inventor(s)   YOKU NANBA ET AL

It is certified that error appears in the above-identified patent and that said Letters Patent are hereby corrected as shown below:

Please insert on the cover page of the above-identified Patent the following paragraph:

-- [30] Foreign Application Priority Date

January 31, 1972, Japan, Application No. 10550/1972 --.

Signed and Sealed this sixteenth Day of September 1975

[SEAL]

Attest:

RUTH C. MASON
Attesting Officer

C. MARSHALL DANN
Commissioner of Patents and Trademarks